(12) United States Patent
Lyons

(10) Patent No.: US 8,440,104 B2
(45) Date of Patent: May 14, 2013

(54) KIMZEYITE GARNET PHOSPHORS

(75) Inventor: Robert Joseph Lyons, Burnt Hills, NY (US)

(73) Assignee: General Electric Company, Niskayuna, NY (US)

(*) Notice: Subject to any disclaimer, the term of this patent is extended or adjusted under 35 U.S.C. 154(b) by 750 days.

(21) Appl. No.: 12/582,969

(22) Filed: Oct. 21, 2009

(65) Prior Publication Data

US 2011/0089817 A1    Apr. 21, 2011

(51) Int. Cl.
*C09K 11/08* (2006.01)

(52) U.S. Cl.
USPC .................................................. 252/301.4 F

(58) Field of Classification Search ............ 252/301.4 R, 252/301.4 F
See application file for complete search history.

(56) References Cited

U.S. PATENT DOCUMENTS

| 3,699,478 | A | 10/1972 | Pinnow et al. | |
|---|---|---|---|---|
| 7,026,756 | B2 | 4/2006 | Shimizu et al. | |
| 7,189,340 | B2 * | 3/2007 | Shimomura et al. | .... 252/301.4 F |
| 7,252,787 | B2 | 8/2007 | Hancu et al. | |
| 7,252,789 | B2 * | 8/2007 | Venkataramani et al. | . 252/301.4 R |
| 2007/0257596 | A1 | 11/2007 | Shimomura et al. | |

OTHER PUBLICATIONS

Wu et al., "Cerium Doped Garnet Phosphors for Application in White GaN-based LEDs", Mat. Res. Soc. Symp. Proc, vol. 667, pp. G5.1.1-G5.1.6, 2001.

* cited by examiner

*Primary Examiner* — Emily Le
*Assistant Examiner* — Lynne Edmondson
(74) *Attorney, Agent, or Firm* — Mary Louise Stanford

(57) ABSTRACT

A phosphor of formula I is included in a phosphor composition in a lighting apparatus capable of emitting white light, $$Ca_{3-x-z}Sr_xCe_zM^1{}_2M^2AlSiO_{12} \qquad (I)$$

wherein
$M^1$ is Hf, Zr, or a combination thereof;
$M^2$ is Al, or a combination of Al and Ga;
$z<3-x$; and
$0.2>x\geq 0$.

The lighting apparatus includes a semiconductor light source in addition to the phosphor composition.

19 Claims, 6 Drawing Sheets

KIMZEYITE GARNET PHOSPHORS

STATEMENT REGARDING FEDERALLY SPONSORED RESEARCH AND DEVELOPMENT

This invention was made with Government support under contract number DE-FC26-06NT42934 awarded by the U.S. Department of Energy. The Government has certain rights in the invention.

BACKGROUND

Light emitting diodes (LEDs) are semiconductor light emitters often used as a replacement for other light sources, such as incandescent lamps. They are particularly useful as display lights, warning lights and indicating lights or in other applications where colored light is desired. The color of light produced by an LED is dependent on the type of semiconductor material used in its manufacture.

Colored semiconductor light emitting devices, including light emitting diodes and lasers (both are generally referred to herein as LEDs), have been produced from Group III-V alloys such as gallium nitride (GaN) and gallium indium nitride (GaInN). To form the LEDs, layers of the alloys are typically deposited epitaxially on a substrate, such as silicon carbide or sapphire, and may be doped with a variety of n and p type dopants to improve properties, such as light emission efficiency. With reference to the GaN-based LEDs, light is generally emitted in the UV and/or blue range of the electromagnetic spectrum. Until quite recently, LEDs have not been suitable for lighting uses where a bright white light is needed, due to the inherent color of the light produced by the LED.

Recently, techniques have been developed for converting the light emitted from LEDs to useful light for illumination purposes. In one technique, the LED is coated or covered with a phosphor layer. A phosphor is a luminescent material that absorbs radiation energy in a portion of the electromagnetic spectrum and emits energy in another portion of the electromagnetic spectrum. Phosphors of one important class are crystalline inorganic compounds of very high chemical purity and of controlled composition to which small quantities of other elements (called "activators") have been added to convert them into efficient fluorescent materials. With the right combination of activators and host inorganic compounds, the color of the emission can be controlled. Most useful and well-known phosphors emit radiation in the visible portion of the electromagnetic spectrum in response to excitation by electromagnetic radiation outside the visible range.

By interposing a phosphor excited by the radiation generated by the LED, light of a different wavelength, e.g., in the visible range of the spectrum, may be generated. Colored LEDs are often used in toys, indicator lights and other devices. Manufacturers are continuously looking for new colored phosphors for use in such LEDs to produce custom colors and higher luminosity.

In addition to colored LEDs, a combination of LED generated light and phosphor generated light may be used to produce white light. The most popular white LEDs are based on blue emitting GaInN chips. The blue emitting chips are coated with a phosphor that converts some of the blue radiation to a complementary color, e.g. a yellow-green emission. The total of the light from the phosphor and the LED chip provides a color point with corresponding color coordinates (x and y) and correlated color temperature (CCT), and its spectral distribution provides a color rendering capability, measured by the color rendering index (CRI).

One known white light emitting device comprises a blue light-emitting LED having a peak emission wavelength in the blue range (from about 440 nm to about 480 nm) combined with a phosphor, such as cerium doped yttrium aluminum garnet $Y_3Al_5O_{12}$: $Ce^{3+}$ ("YAG"). The phosphor absorbs a portion of the radiation emitted from the LED and converts the absorbed radiation to a yellow-green light. The remainder of the blue light emitted by the LED is transmitted through the phosphor and is mixed with the yellow light emitted by the phosphor. A viewer perceives the mixture of blue and yellow light as a white light.

Such systems can be used to make white light sources having correlated color temperatures (CCTs) of >4500 K and color rendering indices (CRIs) ranging from about 75-82. While this range is suitable for many applications, general illumination sources usually require higher CRIs and lower CCTs.

One method of achieving this is to use a GaInN violet emitting LED and three phosphors, one emitting blue, one emitting yellow or green and one emitting red. This method has the advantage that there are a greater number of phosphors available that can be efficiently excited by a violet LED in comparison with a blue LED. It also allows one to choose the blue emission spectra to compensate for the spectral characteristics of the other phosphors, rather that being forced to use the blue LED emission. Thus, a need exists for blue emitting phosphors that can be excited by radiation from a violet emitting LED.

BRIEF DESCRIPTION

Accordingly, in one aspect, the present invention relates to phosphors of formula I $$Ca_{3-x-z} Sr_x Ce_z M^1_2 M^2 AlSiO_{12} \qquad (I)$$

wherein
$M^1$ is Hf, Zr, or a combination thereof;
$M^2$ is Al, or a combination of Al and Ga;
x<3−z; and
0.2<z<0.

In another aspect, the present invention relates to a lighting apparatus that includes a semiconductor light source and a phosphor composition comprising a phosphor of formula I.

In yet another aspect, the present invention relates to phosphor blends containing at least one phosphor of formula I.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
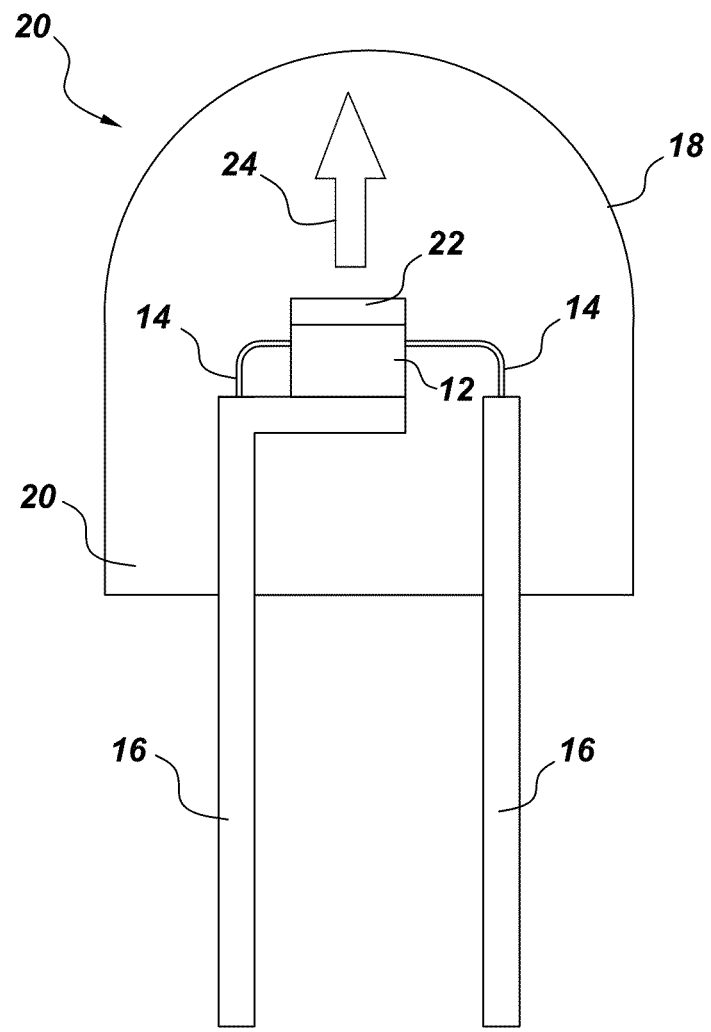
FIG. 1 is a schematic cross-sectional view of a lighting apparatus according to the present invention.

With reference to FIG. 1, a lighting apparatus or light emitting assembly or lamp 10 is shown in accordance with one embodiment of the present invention. Lighting apparatus 10 comprises a semiconductor long wave ultraviolet or violet radiation source, such as a light emitting diode (LED) chip 12 and leads 14 electrically attached to the LED chip. The leads 14 may comprise thin wires supported by a thicker lead frame(s) 16 or the leads may comprise self supported electrodes and the lead frame may be omitted. The leads 14 provide current to the LED chip 12 and thus cause the LED chip 12 to emit radiation.

The lamp may include any semiconductor blue or UV light source that is capable of producing white light when its emitted radiation is directed onto the phosphor or phosphors. In one embodiment, the semiconductor light source comprises a blue emitting LED doped with various impurities. Thus, the LED may comprise a semiconductor diode based on any suitable III-V, II-VI or IV-IV semiconductor layers and having an emission wavelength of about 250 to 550 nm. In particular, the LED may contain at least one semiconductor layer comprising GaN, ZnSe or SiC. For example, the LED may comprise a nitride compound semiconductor represented by the formula $In_iGa_jAl_kN$ (where $0 \leq i$; $0 \leq j$; $0 \leq k$ and $1+j+k=1$) having an emission wavelength greater than about 250 nm and less than about 550 nm. The chip may be a long wave ultraviolet, violet or blue emitting LED having a peak emission wavelength from about 350 to about 450 nm. Such LED semiconductors are known in the art. The radiation source is described herein as an LED for convenience. However, as used herein, the term is meant to encompass all semiconductor radiation sources including, e.g., semiconductor laser diodes.

Although the general discussion of the exemplary structures of the invention discussed herein are directed toward inorganic LED based light sources, it should be understood that the LED chip may be replaced by another radiation source unless otherwise noted and that any reference to LED chip or semiconductor is merely representative of any appropriate radiation source.

The LED chip 12 may be encapsulated within a shell 18, which encloses the LED chip and an encapsulant material 20. The shell 18 may be, for example, glass or plastic. LED 12 may be substantially centered in the encapsulant 20. The encapsulant 20 may be an epoxy, plastic, low temperature glass, polymer, thermoplastic, thermoset material, resin or other type of LED encapsulating material as is known in the art. Optionally, the encapsulant 20 is a spin-on glass or some other high index of refraction material. Encapsulant material 20 is an epoxy or a polymer material, such as silicone, in particular embodiments. Both the shell 18 and the encapsulant 20 may be transparent or substantially optically transmissive with respect to the wavelength of light produced by the LED chip 12 and a phosphor composition 22 (described below). Alternately, the lamp may 10 may only comprise an encapsulant material without an outer shell 18. The LED chip 12 may be supported, for example, by the lead frame 16, by the self-supporting electrodes, the bottom of the shell 18, or by a pedestal (not shown) mounted to the shell or to the lead frame. In some embodiments, the LED chip 12 is mounted in a reflective cup (not shown). The cup may be made from or coated with a reflective material, such as alumina, titania, or other dielectric powder known in the art. A preferred reflective material is $Al_2O_3$.

Lighting apparatus 10 includes phosphor composition 22, described below, radiationally coupled to the LED chip 12. Radiationally coupled means that the elements are associated with each other so radiation from one is transmitted to the other. Phosphor composition 22 is deposited on the LED 12 by any appropriate method. For example, a water-based suspension of the phosphor(s) can be formed, and applied as a phosphor layer to the LED surface. In one such method, a silicone slurry in which the phosphor particles are randomly suspended is placed around the LED. This method is merely exemplary of possible positions of the phosphor composition 22 and LED 12. Thus, the phosphor composition 22 may be coated over or directly on the light emitting surface of the LED chip 12 by coating and drying the phosphor suspension over the LED chip 12. Both the shell 18 and the encapsulant 20 should be transparent to allow white light 24 to be transmitted through those elements. Although not intended to be limiting, in one embodiment, the median particle size of the phosphor composition may be from about 1 to about 10 microns.

In other embodiments, the phosphor composition 22 is interspersed within the encapsulant material 20, instead of being formed directly on the LED chip 12. The phosphor (in the form of a powder) may be interspersed within a single region of the encapsulant material 20 or throughout the entire volume of the encapsulant material. Blue light emitted by the LED chip 12 mixes with the light emitted by the phosphor composition 22, and the mixed light appears as white light. If the phosphor is to be interspersed within the material of encapsulant 20, then a phosphor powder may be added to a polymer precursor, loaded around the LED chip 12, and then the polymer precursor may be cured to solidify the polymer material. Other known phosphor interspersion methods may also be used, such as transfer loading.

In yet another embodiment, phosphor composition 22 is coated onto a surface of the shell 18, instead of being formed over the LED chip 12. The phosphor composition may be coated on the inside surface of the shell 18, although the phosphor may be coated on the outside surface of the shell, if desired. The phosphor composition 22 may be coated on the entire surface of the shell or only a top portion of the surface of the shell. The long wave ultraviolet, violet or blue light emitted by the LED chip 12 mixes with the light emitted by the phosphor composition 22, and the mixed light appears as white light. Of course, the phosphor may be located in any two or all three locations or in any other suitable location, such as separately from the shell or integrated into the LED.

Phosphor composition 22 includes a phosphor of formula I, optionally blended with one or more other phosphors. In particular embodiments, the phosphor of formula I is $Ca_{3-x} Ce_x M_2 Al_2 SiO_{12}$, $Ca_{3-x-z} Sr_x Ce_z Hf Al_2 SiO_{12}$, or $Ca_{3-x-z} Sr_x Ce_z Zr Al_2 SiO_{12}$. In other embodiments, z ranges between about 0.15 and about 0.03, particularly between about 0.05 and about 0.01. In yet other embodiments, x is less than or equal to about 1.5, particularly ranging between about 0.5 and about 1.5.

Figure 2A:
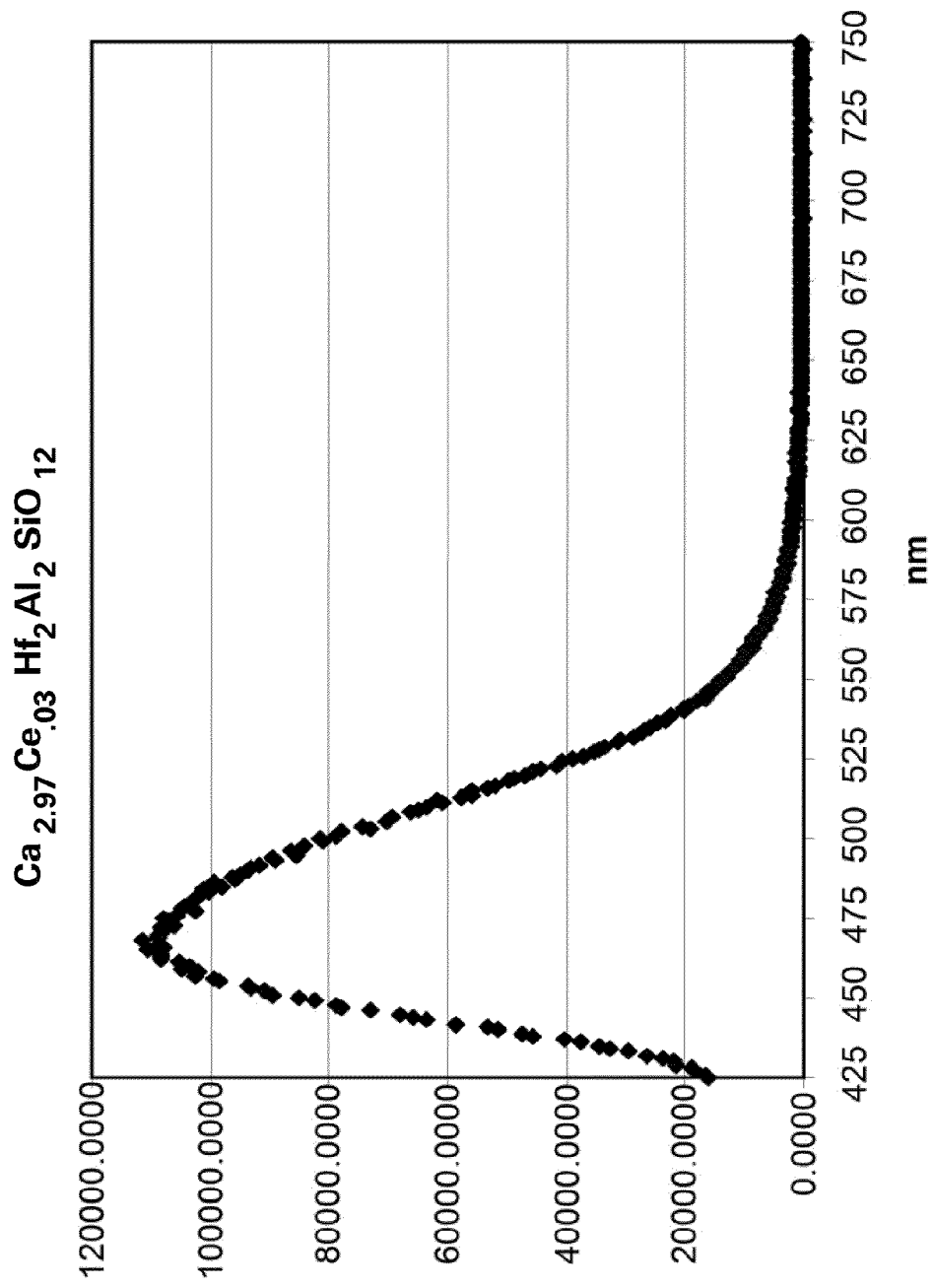
FIG. 2A is an emission spectrum of $Ca_{2.97}Ce_{0.03}Hf_2Al_2SiO_{12}$ after excitation at a wavelength of 405 nm.
Figure 2B:
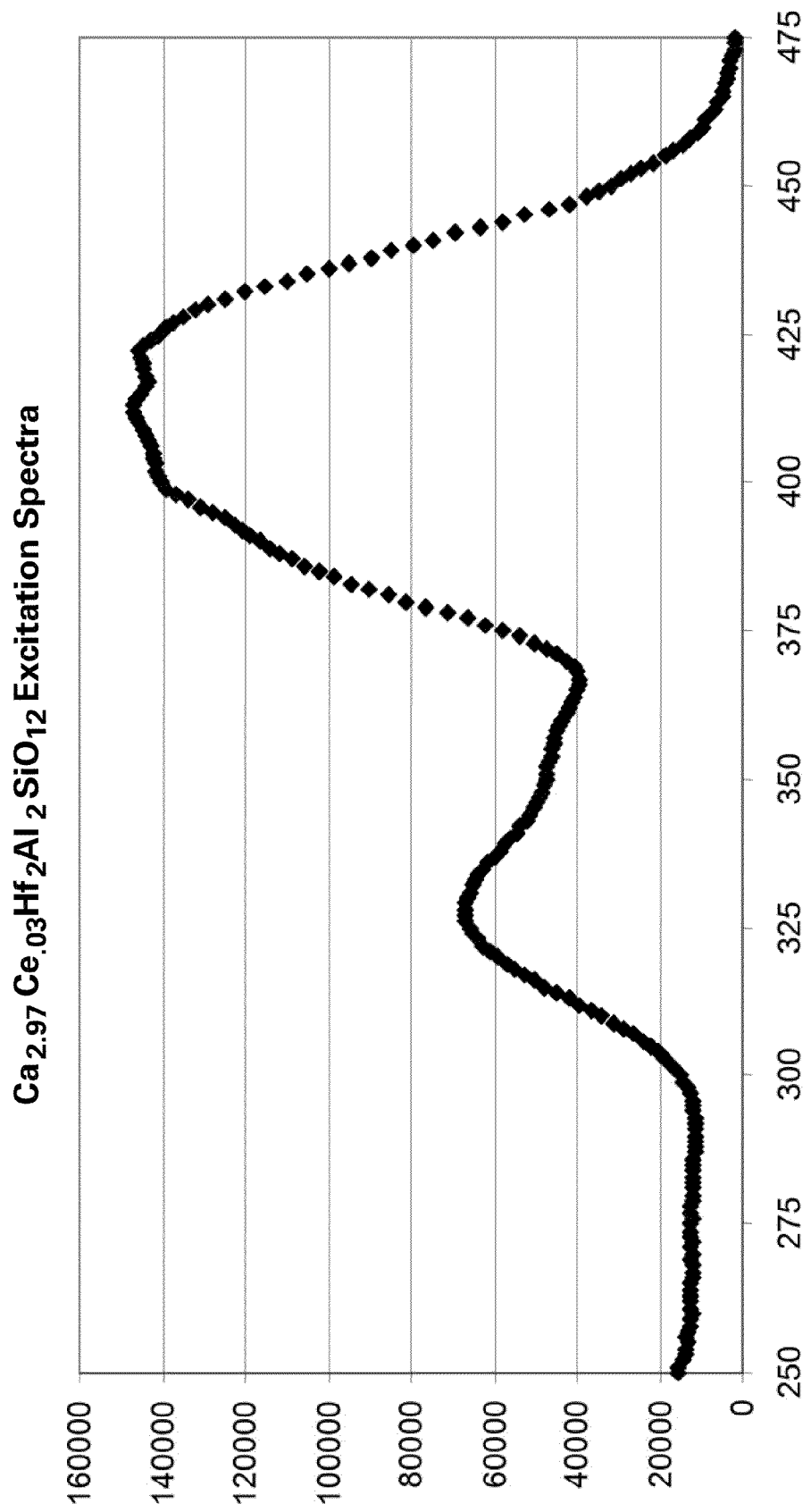
FIG. 2B is an excitation spectrum of $Ca_{2.97}Ce_{0.03}Hf_2Al_2SiO_{12}$.

When used with an LED emitting at from 350 to 450 nm and one or more other appropriate phosphors, the resulting lighting system will produce a light having a white color, the characteristics of which will be discussed in more detail below. FIGS. 2A and 2B show an emission spectrum after excitation at a wavelength of 405 nm and an excitation spectrum of a phosphor of formula I, $Ca_{2.97}Ce_{0.03}Hf_2Al_2SiO_{12}$, a blue phosphor with yellow body color synthesized at 1500°

Figure 3A:
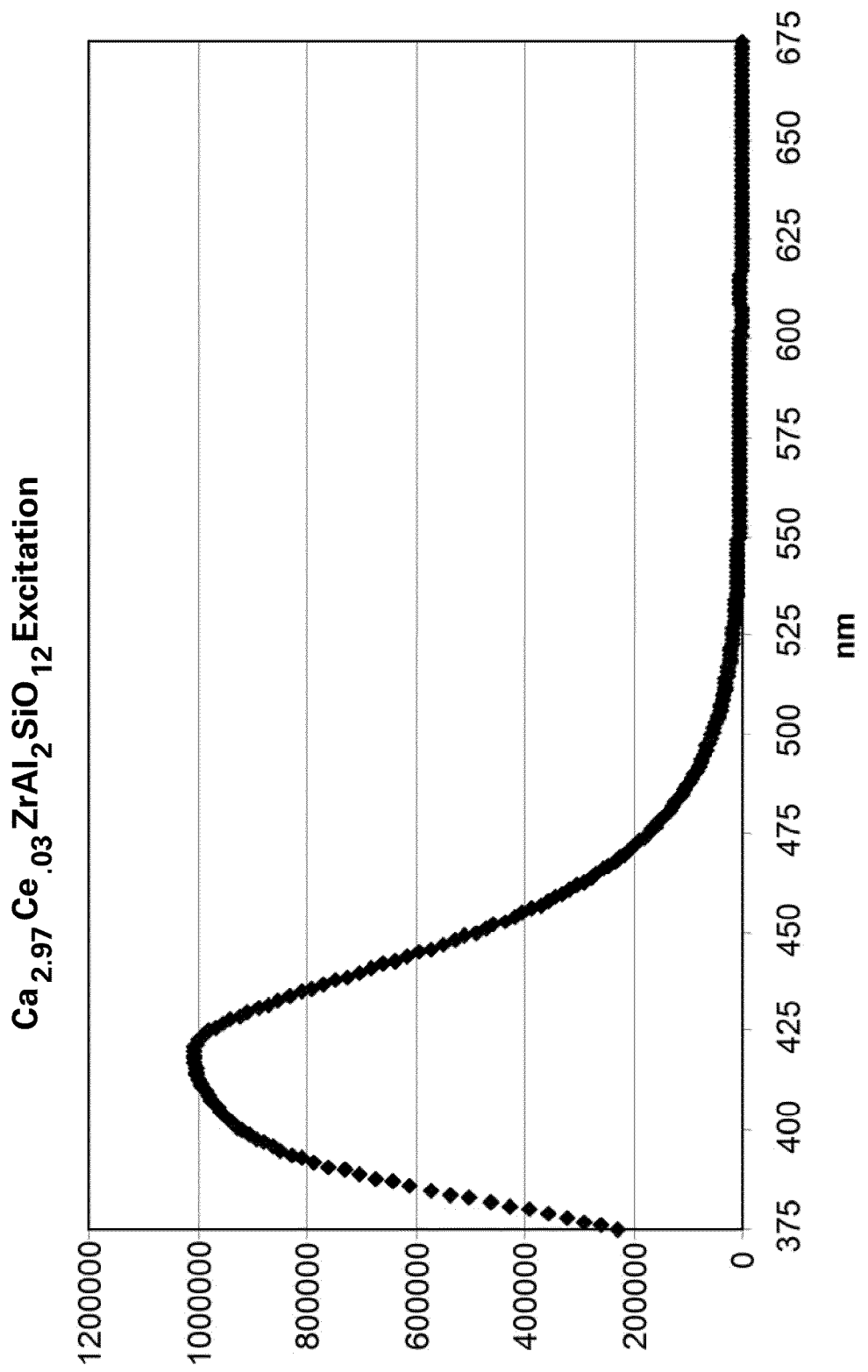
FIG. 3A is an emission spectrum of $Ca_{2.97}Ce_{0.03}Hf_2Al_2SiO_{12}$ after excitation at a wavelength of 355 nm.
Figure 3B:
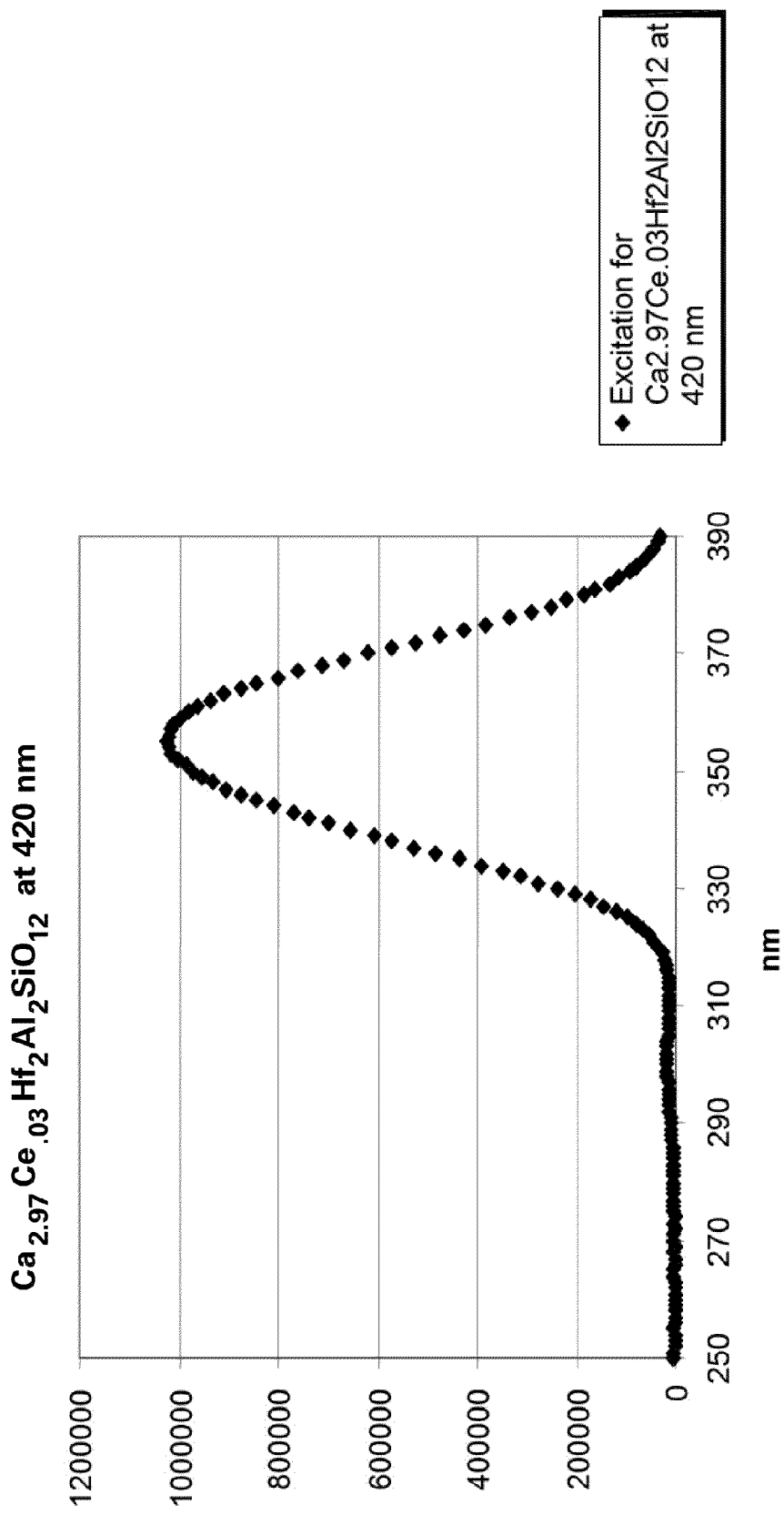
FIG. 3B is an excitation spectrum of $Ca_{2.97}Ce_{0.03}Hf_2Al_2SiO_{12}$ for the emission wavelength of 420 nm.
Figure 4:
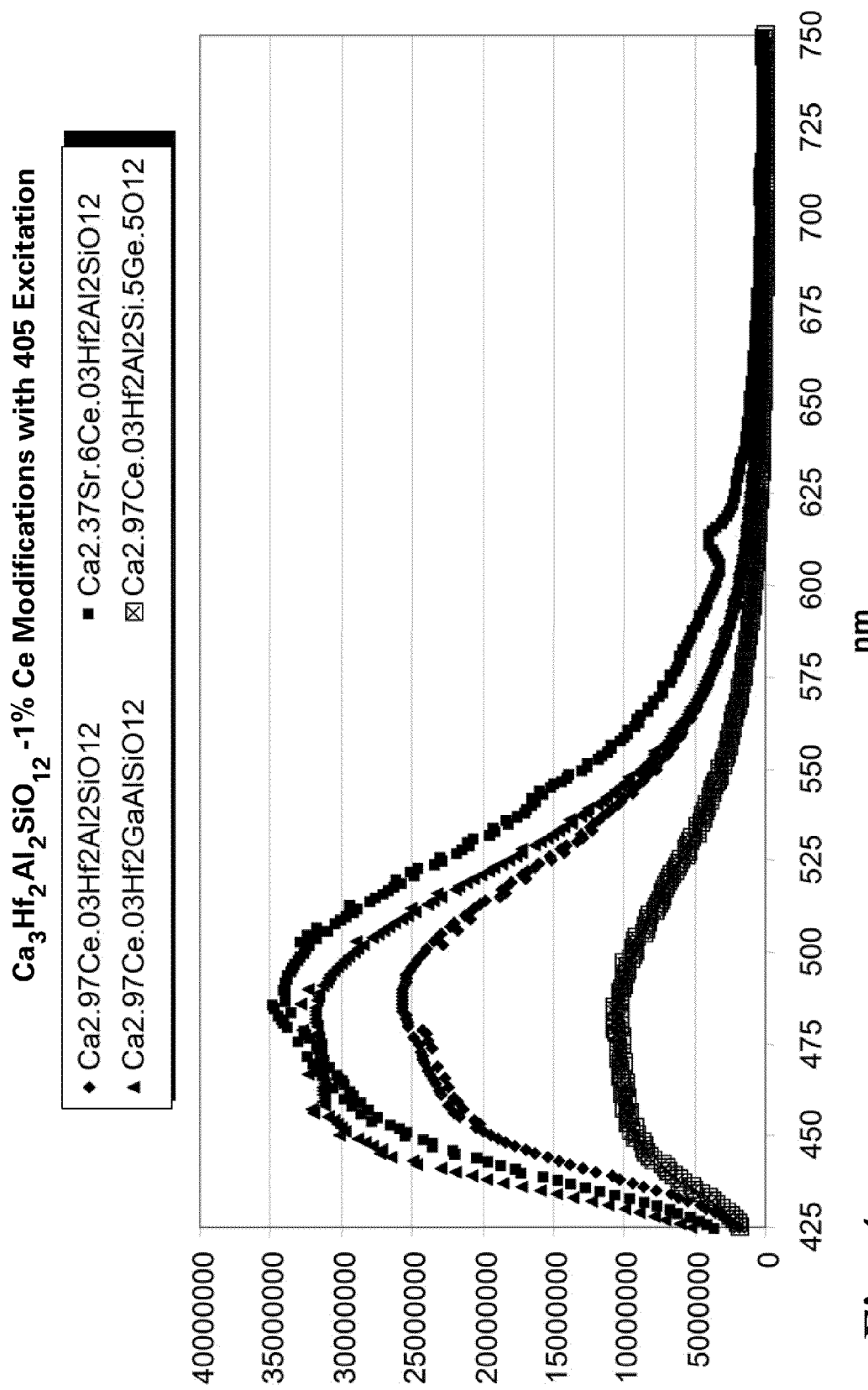
FIG. 4 is a graph comparing emission spectra of kimzeyite phosphors.

C. in reducing atmosphere. FIGS. 3A and 3B show an emission spectrum after excitation at a wavelength of 355 nm and an excitation spectrum of a phosphor of formula I, $Ca_{2.97}Ce_{0.03}Hf_2Al_2SiO_{12}$, a violet phosphor synthesized at 1500° C. in 2% $H$-98% $N_2$. FIG. 4 compares emission spectra of phosphors of formula I, $Ca_{2.97}Ce_{0.03}Hf_2Al_2SiO_{12}$ and $Ca_{2.97}Sr_{0.6}Ce_{0.03}Hf_2Al_2SiO_{12}$, a phosphor having a blue-white emission, synthesized at 1500° C. in 1% $H_2$-99% $N_2$, and $Ca_{2.97}Ce_{0.03}Hf_2GaAlSiO_{12}$, with a phosphor containing germanium, $Ca_{2.97}Ce_{0.03}Hf_2Al_2Si_{0.5}Ge_{0.5}O_{12}$. Other phosphors of formula I include $Ca_{1.47}Sr_{1.5}Ce_{0.03}Hf_2Al_2SiO_{12}$ and $Ca_{1.97}SrCe_{0.03}Hf_2Al_2SiO_{12}$ both phosphors having a blue-white emission, and $Ca_{1.97}SrCe_{0.03}Hf_2GaAlSiO_{12}$.

Lamp 10 may also include scattering particles (not shown), which are embedded in the encapsulant material. The scattering particles may comprise, for example, $Al_2O_3$ particles such as alumina powder or $TiO_2$ particles. The scattering particles effectively scatter the coherent light emitted from the LED chip, with a negligible amount of absorption.

The phosphors of formula I may contain optically inert trace impurities including, for example, calcium silicates and calcium aluminum silicates. The presence of such impurities in an amount up to 10% by weight of the phosphor composition will not significantly affect the quantum efficiency or color of the phosphor.

Phosphors of formula I may be produced using known solid state reaction processes for the production of phosphors by combining, for example, elemental oxides, carbonates and/or hydroxides as starting materials. Other starting materials may include nitrates, sulfates, acetates, citrates, or oxalates. Alternately, coprecipitates of the rare earth oxides could be used as the starting materials for the RE elements. Si may be provided via $SiO_2$, silicic acid, or other sources such as fumed silica.

In one exemplary process of making the above phosphors, an array slurry method is used. Raw materials (such as $CaCO_3$, $SrCO_3$, $CeO_2$, $HfO_2$, $SiO_2$, and $Al_2O_3$) are milled down to micron size powders and then dispersed in water up to 16% by weight solid loading. The slurries may be dispensed into alumina crucibles via a commercial liquid handler under vigorous mixing. The homogenous solid mixture results after water evaporation after firing the slurries at 1200-1700° C. under a reducing atmosphere (e.g. 1% $H_2$ in air).

In another typical process, the starting materials are combined via a dry or wet blending process and fired in air or under a reducing atmosphere at from, e.g., 1000 to 1600° C. A fluxing agent may be added to the mixture before or during the step of mixing. This fluxing agent may be $AlF_3$, $NH_4Cl$ or any other conventional fluxing agent, such as a fluoride of at least one metal selected from the group consisting of terbium, aluminum, gallium, and indium. A quantity of a fluxing agent of less than about 20, particularly less than about 10, percent by weight of the total weight of the mixture is adequate for fluxing purposes.

The starting materials may be mixed together by any mechanical method including, but not limited to, stirring or blending in a high-speed blender or a ribbon blender. The starting materials may be combined and pulverized together in a bowl mill, a hammer mill, or a jet mill. The mixing may be carried out by wet milling especially when the mixture of the starting materials is to be made into a solution for subsequent precipitation. If the mixture is wet, it may be dried first before being fired under a reducing atmosphere at a temperature from about 900° C. to about 1700° C., or from about 1000° C. to about 1600° C., for a time sufficient to convert all of the mixture to the final composition.

The firing may be conducted in a batchwise or continuous process, with a stirring or mixing action to promote good gas-solid contact. The firing time depends on the quantity of the mixture to be fired, the rate of gas conducted through the firing equipment, and the quality of the gas-solid contact in the firing equipment. Typically, a firing time up to about 10 hours is adequate. The reducing atmosphere typically comprises a reducing gas such as hydrogen, carbon monoxide, or a combination thereof, optionally diluted with an inert gas, such as nitrogen or helium, or a combination thereof. Alternatively, the crucible containing the mixture may be packed in a second closed crucible containing high-purity carbon particles and fired in air so that the carbon particles react with the oxygen present in air, thereby, generating carbon monoxide for providing a reducing atmosphere.

These compounds may be blended and dissolved in a nitric acid solution. The strength of the acid solution is chosen to rapidly dissolve the oxygen-containing compounds and the choice is within the skill of a person skilled in the art. Ammonium hydroxide is then added in increments to the acidic solution. An organic base such as methanolamine, ethanolamine, propanolamine, dimethanolamine, diethanolamine, dipropanolamine, trimethanolamine, triethanolamine, or tripropanolamine may be used in place of ammonium hydroxide.

The precipitate is filtered, washed with deionized water, and dried. The dried precipitate is ball milled or otherwise thoroughly blended and then calcined in air at about 400° C. to about 1600° C. for a sufficient time to ensure a substantially complete dehydration of the starting material. The calcination may be carried out at a constant temperature. Alternatively, the calcination temperature may be ramped from ambient to and held at the final temperature for the duration of the calcination. The calcined material is similarly fired at 1000-1600° C. for a sufficient time under a reducing atmosphere such as $H_2$, CO, or a mixture of one of these gases with an inert gas, or an atmosphere generated by a reaction between a coconut charcoal and the products of the decomposition of the starting materials to covert all of the calcined material to the desired phosphor composition.

While suitable in many applications alone with a blue or UV LED chip, the above two phosphor compositions may be blended with each other or one or more additional phosphors for use in LED light sources. Thus, in another embodiment, an LED lighting apparatus is provided including a phosphor composition 22 comprising a blend of a phosphor from one of the above embodiments with one or more additional phosphors.

The relative amounts of each phosphor in the phosphor composition can be described in terms of spectral weight. Spectral weight is the relative amount that each phosphor contributes to the overall emission spectrum of the device. The spectral weight amounts of all the individual phosphors and any residual bleed from the LED source should add up to 1.0 (i.e. 100%). In one embodiment, each of the above-described phosphors in the blend will have a spectral weight ranging from about 0.001 to 0.75. In some embodiments, blends including a spectral weight of from 0.001 to 0.600 for the phosphor of formula I, and from 0.001 to 0.0600 of the yellow, orange or red phosphor may be used. Any known yellow-orange or red phosphor suitable for use in UV or blue LED systems may be used. In addition, other phosphors such as green, blue, orange, or other color phosphors may be used in the blend to customize the white color of the resulting light and produce higher CRI sources. While not intended to be limiting, suitable phosphors for use in the blend with the present invention phosphors include:

Yellow-Orange:
$(Sr,Ca,Ba,Mg,Zn)_2P_2O_7:Eu^{2+}, Mn^{2+}$ (SPP);
$(Ca,Sr,Ba,Mg)_{10}(PO_4)_6(F,Cl,Br,OH): Eu^{2+}, Mn^{2+}$ (HALO);
Red:
$(Gd,Y,Lu,La)_2O_3:Eu^{3+}, Bi^{3+}$
$(Gd,Y,Lu,La)_2O_2S:Eu^{3+},Bi^{3+}$
$(Gd,Y,Lu,La)VO_4:Eu^{3+},Bi^{3+}$
$(Ca,Sr)S:Eu^{2+}$
$SrY_2S_4:Eu^{2+}$
$CaLa_2S_4:Ce^{3+}$
$(Ca,Sr)S:Eu^{2+}$
$3.5MgO*0.5MgF_2*GeO_2:Mn^{4+}$ (MFG)
$(Ba,Sr,Ca)MgP_2O_7:Eu^{2+},Mn^{2+}$
$(Y,Lu)_2WO_6:Eu^{3+}, Mo^{6+}$
$(Ba,Sr,Ca)_xSi_yN_z:Eu^{2+}$
$(Sr,Ca,Ba)_3MgSi_2O_8:Eu^{2+},Mn^{2+}$ The ratio of each of the individual phosphors in the phosphor blend may vary depending on the characteristics of the desired light output. The relative proportions of the individual phosphors in the various embodiment phosphor blends may be adjusted such that when their emissions are blended and employed in an LED lighting device, there is produced visible light of predetermined x and y values on the CIE chromaticity diagram. As stated, a white light may be produced. This white light may, for instance, may possess an x value in the range of about 0.30 to about 0.55, and a y value in the range of about 0.30 to about 0.55. As stated, however, the exact identity and amounts of each phosphor in the phosphor composition can be varied according to the needs of the end user.

The phosphor composition described above may be used in additional applications besides LEDs. For example, the material may be used as a phosphor in a fluorescent lamp, in a cathode ray tube, in a plasma display device or in a liquid crystal display (LCD). The material may also be used as a scintillator in an electromagnetic calorimeter, in a gamma ray camera, in a computed tomography scanner or in a laser. These uses are meant to be merely exemplary and not exhaustive.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A lighting apparatus capable of emitting white light, said lighting apparatus comprising
    a semiconductor light source; and
    a phosphor composition radiationally coupled to the light source, and comprising a phosphor that emits blue light upon excitation by the semiconductor light source, of formula I $$Ca_{3-x-z}Sr_xCe_zM^1_2M^2AlSiO_{12} \qquad (I)$$

wherein
    $M^1$ is Hf, Zr, or a combination thereof;
    $M^2$ is Al, or a combination of Al and Ga;
    $x<3-z$;
    $0.2>z>0$.

2. A lighting apparatus according to claim 1, wherein said phosphor is of formula $Ca_{3-z}Ce_zM^1_2Al_2SiO_{12}$.

3. A lighting apparatus according to claim 1, wherein said phosphor is of formula $Ca_{3-x-z}Sr_xCe_zHf_2M^2AlSiO_{12}$.

4. A lighting apparatus according to claim 1, wherein said phosphor is of formula $Ca_{3-x-z}Sr_xCe_zHf_2Al_2SiO_{12}$.

5. A lighting apparatus according to claim 1, wherein said phosphor is of formula $Ca_{3-x-z}Sr_xCe_zZr_2Al_2SiO_{12}$.

6. A lighting apparatus according to claim 1, wherein $0.15>z\geq 0.03$.

7. A lighting apparatus according to claim 1, wherein $0.05>z>0.01$.

8. A lighting apparatus according to claim 1, wherein $x\leq 1.5$.

9. A lighting apparatus according to claim 1, wherein $0.5<x\leq 1.5$.

10. A lighting apparatus according to claim 1, wherein the light source is a semiconductor light emitting diode emitting radiation of wavelength ranging from about 350 to about 450 nm.

11. A lighting apparatus according to claim 8, wherein the semiconductor light emitting diode comprises a nitride compound semiconductor represented by the formula $In_iGa_jAl_kN$;
    wherein
        $0\leq i$;
        $0\leq j$;
        $0\leq k$, and
        $i+j+k=1$.

12. A lighting apparatus according to claim 1, wherein said phosphor composition further comprises one or more phosphors in addition to the phosphor of formula I.

13. A lighting apparatus according to claim 1, wherein said phosphor is of formula $Ca_{2.97}Ce_{.03}Hf_2Al_2SiO_{12}$.

14. A lighting apparatus according to claim 1, wherein said phosphor is of formula $Ca_{2.97}Ce_{0.03}Zr_2Al_2SiO_{12}$.

15. A lighting apparatus according to claim 1, wherein said phosphor is of formula $Ca_{2.37}Sr_{0.6}Ce_{0.03}Hf_2Al_2SiO_{12}$.

16. A lighting apparatus according to claim 1, wherein said phosphor is of formula $Ca_{1.47}Sr_{1.5}Ce_{0.03}Hf_2Al_2SiO_{12}$.

17. A lighting apparatus according to claim 1, wherein said phosphor is of formula $Ca_{1.97}SrCe_{0.03}Hf_2Al_2SiO_{12}$.

18. A lighting apparatus according to claim 1, wherein said phosphor is of formula $Ca_{2.97}Ce_{.03}Hf_2GaAlSiO_{12}$.

19. A lighting apparatus according to claim 1, wherein said phosphor is of formula $Ca_{1.97}SrCe_{0.03}Hf_2GaAlSiO_{12}$.

* * * * *